United States Patent
Liu et al.

(10) Patent No.: US 11,639,542 B2
(45) Date of Patent: *May 2, 2023

(54) MULTI-SCALE AND MULTI-PHASE DISPERSION STRENGTHENED IRON-BASED ALLOY, AND PREPARATION AND CHARACTERIZATION METHODS THEREOF

(71) Applicant: CENTRAL SOUTH UNIVERSITY, Hunan (CN)

(72) Inventors: Zuming Liu, Hunan (CN); Quan Li, Hunan (CN); Boyun Huang, Hunan (CN); Xueqian Lv, Hunan (CN); Kai Peng, Hunan (CN); Fan Zhao, Hunan (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 37 days.

This patent is subject to a terminal disclaimer.

(21) Appl. No.: 17/263,160

(22) PCT Filed: Aug. 30, 2018

(86) PCT No.: PCT/CN2018/103115
§ 371 (c)(1),
(2) Date: Jan. 26, 2021

(87) PCT Pub. No.: WO2020/019401
PCT Pub. Date: Jan. 30, 2020

(65) Prior Publication Data
US 2021/0178469 A1    Jun. 17, 2021

(30) Foreign Application Priority Data
Jul. 27, 2018 (CN) .......................... 201810845451.3

(51) Int. Cl.
*B22F 1/0545* (2022.01)
*B22F 3/20* (2006.01)
(Continued)

(52) U.S. Cl.
CPC ............ *B22F 1/0545* (2022.01); *B22F 1/145* (2022.01); *B22F 1/147* (2022.01); *B22F 3/20* (2013.01);
(Continued)

(58) Field of Classification Search
CPC ..... B22F 1/0545; B22F 9/04–2009/049; B22F 3/20–2003/208; C22C 33/00; C22C 33/02–0292; C22C 32/0026
See application file for complete search history.

(56) References Cited

U.S. PATENT DOCUMENTS 4,963,200 A * 10/1990 Okuda ................ C22C 32/0026
148/326
7,273,584 B2 * 9/2007 Ohtsuka .................. C22C 38/28
419/48

(Continued)

FOREIGN PATENT DOCUMENTS

| CN | 1664145 | 9/2005 |
|---|---|---|
| CN | 101265530 | 9/2008 |

(Continued)

OTHER PUBLICATIONS

Oksiuta Z., et al.; "Development and characterisation of a new ODS ferritic steel for fusion reactor application", J. of Nuclear Materials, 393, 2009, 114-119 (Year: 2009).*

(Continued)

*Primary Examiner* — Alexandra M Moore
*Assistant Examiner* — Austin Pollock
(74) *Attorney, Agent, or Firm* — JCIPRNET

(57) ABSTRACT

A multi-scale and multi-phase dispersion strengthened iron-based alloy, and preparation and characterization methods (Continued)

thereof are provided. The alloy contains a matrix and a strengthening phase. The strengthening phase includes at least two types of the strengthening phase particles with different sizes. A volume of the two types of the strengthening phase particles with different sizes having a particle size less than or equal to 50 nm accounts for 85-95% of a total volume of all the strengthening phase particles. The matrix is a Fe—Cr—W—Ti alloy. The strengthening phases include crystalline $Y_2O_3$ phase, Y—Ti—O phase, Y—Cr—O phase, and Y—W—O phase. The characterization method comprises electrolytically separating the strengthening phases in the alloy, and then characterizing by using an electron microscope. The tensile strength of the prepared alloy is more than 1600 MPa at room temperature, and is more than 600 MPa at 700° C.

4 Claims, 4 Drawing Sheets

(51) Int. Cl.
| | |
|---|---|
| B22F 9/04 | (2006.01) |
| C22C 33/02 | (2006.01) |
| B22F 1/145 | (2022.01) |
| C22C 32/00 | (2006.01) |
| C22C 38/28 | (2006.01) |
| C22C 38/22 | (2006.01) |
| B82Y 40/00 | (2011.01) |
| B22F 3/24 | (2006.01) |
| B22F 3/18 | (2006.01) |

(52) U.S. Cl.
CPC ............ *B22F 9/04* (2013.01); *C22C 32/0026* (2013.01); *C22C 33/0207* (2013.01); *C22C 38/22* (2013.01); *C22C 38/28* (2013.01); *B22F 2003/185* (2013.01); *B22F 2003/208* (2013.01); *B22F 2003/248* (2013.01); *B22F 2009/041* (2013.01); *B22F 2009/043* (2013.01); *B22F 2201/11* (2013.01); *B22F 2201/20* (2013.01); *B22F 2301/35* (2013.01); *B22F 2302/25* (2013.01); *B22F 2304/054* (2013.01); *B22F 2304/10* (2013.01); *B82Y 40/00* (2013.01)

(56) References Cited

U.S. PATENT DOCUMENTS

| | | | |
|---|---|---|---|
| 7,361,235 B2* | 4/2008 | Ohtsuka | C22C 38/005 |
| | | | 148/609 |
| 2015/0252458 A1* | 9/2015 | Kim | B22F 9/04 |
| | | | 75/235 |

FOREIGN PATENT DOCUMENTS

| | | | |
|---|---|---|---|
| CN | 102994884 | | 3/2013 |
| CN | 102814503 | | 4/2014 |
| CN | 104651703 A | * | 5/2015 |
| CN | 105154756 | | 12/2015 |
| CN | 106825587 | | 6/2017 |
| CN | 108907209 | | 11/2018 |

OTHER PUBLICATIONS

"International Search Report (Form PCT/ISA/210) of PCT/CN2018/103115", dated Apr. 26, 2019, with English translation thereof, pp. 1-4.

T. Okuda, et al., "Dispersion behaviour of oxide particles in mechanically alloyed ODS steel," Journal of Materials Science Letters, vol. 14, Jan. 1995, pp. 1600-1603.

Yuuji Kimura, et al., "Ultra Grain Refining and Decomposition of Oxide during Super-heavy Deformation in Oxide Dispersion Ferritic Stainless Steel Powder," ISM International, vol. 39, Jan. 1999, pp. 176-182.

Shashanka. R, et al., "Phase transformation and microstructure study of nano-structured austenitic and ferritic stainless steel powders prepared by planetary milling," Powder Technology, vol. 259, Mar. 2014, pp. 125-136.

Wenxue Li, et al., "The effect of Zr, Ti addition on the particle size and microstructure evolution of yttria nanoparticle in ODS steel," Powder Technology, vol. 319, Jun. 2017, pp. 172-182.

Lin Zhang, et al., "Y2O3 evolution and dispersion refinement in Co-base ODS alloys," Acta Materialia, vol. 57, Apr. 2009, pp. 3671-3682.

Behnoush Dousti, et al., "Microstructural evolution and chemical redistribution in Fe—Cr—W—Ti—Y2O3 nanostructured powders prepared by ball milling," Journal of Alloys and Compounds, vol. 577, May 2013, pp. 409-416.

Xu Yan-Long, et al., "Preparation of MgO dispersion strengthening ferrous materials by internal oxidation," Materials Science and Engineering of Powder Metallurgy, vol. 20, Jun. 2015, pp. 431-437.

* cited by examiner

MULTI-SCALE AND MULTI-PHASE DISPERSION STRENGTHENED IRON-BASED ALLOY, AND PREPARATION AND CHARACTERIZATION METHODS THEREOF

CROSS-REFERENCE TO RELATED APPLICATION

This application is a 371 of international application of PCT application serial no. PCT/CN2018/103115, filed on Aug. 30, 2018, which claims the priority benefit of China application no. 201810845451.3, filed on Jul. 27, 2018. The entirety of each of the above mentioned patent applications is hereby incorporated by reference herein and made a part of this specification.

TECHNICAL FIELD

The present disclosure relates to a multi-scale and multi-phase dispersion strengthened iron-based alloy, and preparation and characterization methods thereof, and belongs to the field of powder metallurgy materials.

BACKGROUND

Oxide dispersion strengthened (ODS) iron-based alloy has excellent mechanical properties and resistance to high-temperature oxidation and corrosion. It has broad application prospects in nuclear reactor systems and hot working equipment.

Traditionally, mechanical alloying (MA) and internal oxidation are two mainly methods to prepare the ODS iron-based alloy, both of which are introducing an oxide into alloy matrix. Generally, an oxide powder such as $Y_2O_3$ is mixed with raw alloy powder, and dispersed oxide particles into alloy powder matrix by mechanical ball milling. During the subsequent forming, the oxide particles homogeneous dispersed in the alloy matrix result in strengthening effect [T Okuda, et al., J Mater Sci Lett 14 (1995) 1600; and Y Kimura, et al., ISIJ INT 39 (1999) 176]; or, after mechanical alloying (MA) for a long time, $Y_2O_3$ particles are decomposed into Y and O atoms, which are solid-solved in the Fe matrix to form a supersaturated solid solution of Y and O atoms. Then, Y and O atoms reconstruct an oxide strengthening phase during powder hot-forming [R Shashanka, et al., Powder Technol 259 (2014) 125; and Li Wenxue, et al., Powder Technol 319 (2017) 172]. Actually, it is hard to decompose $Y_2O_3$ into Y and O atoms and then solved into the iron alloy matrix by MA. In the subsequent forming process, a large-sized oxide with inhomogeneous distribution tends to be formed, which leads to seriously reduce the mechanical properties of the alloy [Lin Zhang, et al., Acta Mater 57(2009)3671]. The elemental metal Fe, Cr, W, and Ti powder were mechanical alloyed with $Y_2O_3$, as reported by Dousti et al. [Behnoush Dousti, et al., J Alloy Compd 577 (2013) 409], but severe inhomogeneous distribution of elements is found in the prepared mechanical alloyed powder, the $Y_2O_3$ particle size is coarse, without new oxide strengthening phase in alloy matrix.

In view of the above problems, an MgO dispersion-strengthened iron-based alloy is prepared through internal oxidation, as reported by Xu et al. [Xu Yanlong et al., Materials Science and Engineering of Powder Metallurgy, 2015, 20(3): 431-437]. The resulting strengthening phase is a single MgO phase with a size of larger than 1 μm, and the room temperature tensile strength of the alloy is lower than 342 MPa. Chinese Patent No. CN102994884A discloses an efficient method for preparing a nano-structure oxide dispersion-strengthened steel. Instead of the conventional process of atomization of master alloy (excluding Y and Ti) and then mechanical alloying of atomized powder with $Y_2O_3$ and Ti for a long time, gas atomization is used to directly (in one step) prepare solid solution alloy powder supersaturated by Y and Ti. However, this patent does not provide a method for introducing oxygen required to form an oxide strengthening phase. Chinese Patent No. CN101265530A discloses a method for preparing a cluster dispersion-strengthened iron-based alloy by mold pressing an atomized pre-alloyed iron-based powder at room temperature, sintering at 1350° C. for 2 h, and then forging at 900° C. to 1200° C. This method has a simple preparation process, but the powder surface was oxidized due to the long time exposure at high-temperature, which reduces the mechanical properties of the material. Therefore, it is difficult to prepare a high-performance oxide dispersion-strengthened iron-based alloy. Chinese Patent No. CN1664145A discloses a method for preparing an oxide dispersion strengthened ferrite alloy by chemical infiltration. A pre-alloyed powder is soaked with a $Y(NO_3)_3.6H_2O$ solution, after drying, then decomposed into $Y_2O_3$ by heating under a hydrogen atmosphere to obtain a $Y_2O_3$ dispersion-strengthened ferrite alloy powder, which is then thermally densified to prepare a bulk material. This method introduces new pollution due to the use of chemical reagents, and is inconvenient to operate. Besides, the $Y_2O_3$ particles are totally attached to the powder surface, and in the subsequent powder forming process, $Y_2O_3$ segregate at the interface of the original powder to form large-size oxide particles, causing inhomogeneous distribution of $Y_2O_3$ in the prepared bulk materials, and the dispersion effect cannot be guaranteed. Chinese Patent No. CN201110154483.7 discloses a method for preparing a nano-scale $Y_2O_3$ particle dispersion strengthened ferrite alloy steel powder. First, ethylenediamine tetraacetic acid and chromic nitrate are added to water and stirred at 50-60° C. for at least 12 h to obtain a mixed solution. Then citric acid, ferric nitrate, ammonium paratungstate, yttrium nitrate and tetrabutyl titanate are added to the mixed solution and stirred at 60 to 70° C. for at least 3 h to obtain a sol. Subsequently, polyethylene glycol is added to the sol and stirred at 70 to 80° C. until a gel is formed. Finally, the gel is dried at 100-120° C. for at least 12 h, and then baked at 300-600° C. for 4-5 h, to obtain a precursor oxide powder. The precursor oxide powder is calcined at 1100 to 1300° C. for at least 3 h under a reducing atmosphere, to prepare a nano-yttrium oxide particle dispersion strengthened ferrite alloy steel powder with yttrium oxide homogeneous distributed in a matrix composed of chromium, tungsten, titanium and iron. The powder consists of chromium, tungsten, titanium and yttrium oxide at a ratio of 12-14 wt. %:2-3 wt. %:0.2-0.5 wt. %:0.1-1.0 wt. %, with the rest being iron, and the powder shape is granular or cylindrical. The granular powder has a particle diameter of 1 to 10 μm, and the cylindrical powder has a column diameter of 2-5 μm, a length of 5-10 μm. Alternatively, the power is of an ellipsoid shape with a long axis of 15 to 20 nm and a short axis of 10 to 15 nm. This is a chemical method of preparing powder, by which a powder with yttrium oxide homogeneous dispersed in the matrix can be obtained. However, the process is complicated, has a higher cost of raw materials and process, and may introduce impurities and pollution by the use of a large amount of chemical reagents.

Above all, the present disclosure proposes a multi-scale and multi-phase dispersion strengthened iron-based alloy, and preparation and characterization methods thereof. The methods comprise preparing an iron-based alloy powder with multi-scale and multiple oxides dispersion distribution by mechanical alloying an atomized Fe—Cr—W—Ti pre-alloyed powder and $Y_2O_3$ powder, and then the prepared iron-based alloy powder was hot extruded, hot rolled and heat treated to prepare a multi-scale (several nanometers to hundreds of nanometers) and multi-phase (Y—Ti—O nanocluster, Y—Ti—O phase, Y—Cr—O phase, Y—W—O phase and $Y_2O_3$ phase) dispersion strengthened iron-based alloy. The design ideas of the multi-scale and multi-phase dispersion strengthened iron-based alloy, which utilize nano and submicron scale strengthening phase to realize intragranular and grain boundary strengthening, and utilize multiple oxide dispersion strengthening, and the technology of multi-scale multi-phase dispersion strengthened iron-based alloy prepared by combining mechanical alloying for preparing alloy powder and then hot extrusion, have not been reported in related literatures.

The present disclosure provides a multi-scale and multi-phase dispersion strengthened iron-based alloy, and preparation and characterization methods thereof. The tensile strength of the prepared alloy is more than 1600 MPa at room temperature, and more than 600 MPa at 700° C. The prepared alloy has good plasticity. The comprehensive mechanical properties of the prepared alloy are significantly better than those of alloys of the same grade and the same type.

The key technical problems encountered in the development of the present disclosure are:

(1) Proposals for Designing Idea of Multi-Scale and Multi-Type Oxide Dispersion Strengthening Phases During the development of the present disclosure, achieving homogeneous distribution of nano-scaled oxides is a key point for fabricating excellent properties ODS iron-based alloys according to the existing oxides strengthening theory and ODS iron-based alloy preparation technology.

Hence, the research on the control of oxide size and distribution is carried out first, various ways of introducing and controlling oxides had been designed:

The ODS alloy containing nano oxide can be prepared by using an atomized oxygen-containing pre-alloyed iron-based powder, but has poor mechanical properties due to the inhomogeneous dispersion of oxides cannot be controlled.

The alloy prepared by surface oxidization of atomized pre-alloyed iron-based powder, followed by powder forming, subsequent deformation processing and heat treatment, has the coarse oxide strengthening particles, inhomogeneous distribution, and poor mechanical properties.

The alloy prepared by mixing $Fe_2O_3$ with atomized pre-alloyed iron-based powder, followed mechanical alloying, powder forming, deformation processing and heat treatment, has residual $Fe_2O_3$ and inhomogeneous distribution of oxide, and poor oxidation resistance.

The alloy prepared by mixing a rare earth oxide powder containing $Y_2O_3$, especially a $Y_2O_3$ power, with an atomized pre-alloyed iron-based powder, followed mechanical alloying to obtain the powder containing nano-scale $Y_2O_3$ homogeneous distributed in the matrix, then powder forming, deformation processing and heat treatment sequentially, has a dispersed nano-strengthening phase, and good mechanical properties at room temperature. The prepared alloy has a high strength at 550° C., but the strength rapidly decreases above 600° C.

Based on strengthening theory and deformation theory of the alloy, a design idea of ODS alloys using nano-scale and submicron-scale oxide strengthening phases to strengthen the alloy matrix and grain boundaries is proposed for the first time. It is proposed for the first time to use mechanical milling to achieve nano-sized $Y_2O_3$ with high-density defects and amorphization, and obtain the powder with nanometer and submicron amorphous $Y_2O_3$, crystalline $Y_2O_3$, and multiple oxides (including Y—Ti—O, Y—Cr—O and Y—W—O etc.) homogeneous distributed in the matrix. It is able to form microstructure of multi-scale and multiple oxides homogeneous distributed in the alloy prepared by powder forming, which can effectively improve the high-temperature mechanical properties of the alloy.

(2) Preparation of Multi-Type and Multi-Scale Dispersion Strengthening Phases

During the development of the present disclosure, the methods for introducing oxide strengthening phases into alloy powder matrix include: using oxide to participate in reaction, preparing oxygen-containing powder by atomization of oxygen-containing gas, and forming oxide strengthening phase by pre-oxidization of the alloy powder surface followed by replacement reaction. However, all these methods are difficult to obtain the required oxide strengthening phases effectively, and it is difficult to control the microstructure, content, size and distribution of the strengthening phases. In addition, the high temperature properties of the alloy prepared by such methods are poor. Finally, the present disclosure uses $Y_2O_3$ as a strengthening phase raw material to prepare the powder containing homogeneous dispersed multi-scale strengthening oxides by mechanical alloying using milling balls with six diameters.

Mechanical ball milling was once performed using one kind of milling ball with a single diameter, and only the single fine $Y_2O_3$ phase was introduced into the as-milled alloy powder. The present disclosure designs the combinations of milling balls with various diameters and the ball-to-material ratios, which is used for Y2O3 powder ball milling, so that $Y_2O_3$ powder can obtain high-density defects while being nano-sized, structure transformation and amorphization of $Y_2O_3$ occur during the mechanical milling, thereby obtain strengthening phases composed of crystalline $Y_2O_3$ and amorphous $Y_2O_3$ and Y—Ti—O, Y—Cr—O, and Y—W—O, and the alloy powder containing multi-scale and multi-structure strengthening oxide phases is obtained. Wherein the structure characteristic of amorphous $Y_2O_3$ provides key condition for the formation of more stable complex oxides.

(3) Selection of Hot Forming Method

In the development process of the present disclosure, a variety of hot forming methods of powder metallurgy have been tried, wherein the processes, such as the mold pressing+sintering, or spark plasma sintering (SPS) method, is difficult to densify the alloy.

Finally, the fully dense alloy which containing multi-phase dispersion strengthened can be obtained by hot extrusion.

(4) Selection of Hot Extrusion Temperature

The effect of a range of extrusion temperatures to form alloys have been tried during the development of the present disclosure. It is found that the densified alloys cannot be obtained when the extrusion temperature is lower than 800° C., and the extrusion process is also difficult to perform. When the extrusion temperature is higher than 1100° C., the alloys are densified, but the strengthening phase is a single one and the size is coarse.

Finally, the extrusion temperature is determined according to the DSC thermodynamic curve of the alloy powder. The extrusion temperature is preferably controlled to 850 to 1100° C., and more preferably at 850 to 950° C.

(5) In the development of the present disclosure, we found that it is difficult to characterize the strengthening phase by a transmission electron microscope (TEM) or a high resolution transmission electron microscope (HRTEM). This also makes it impossible to accurately characterize the structure and proportion of the strengthening phases with a size of 50 nm and below. Therefore, the effect of the structure and proportion of the strengthening phases with a size of 50 nm and below on the properties of the prepared alloy powder and bulk cannot be studied. To solve this problem, the present disclosure has also developed a corresponding characterization method for the first time.

SUMMARY

According to the present disclosure, a multi-scale and multi-phase dispersion strengthened iron-based alloy, and preparation and characterization methods thereof, the multi-scale and multi-phase dispersion strengthened iron-based alloy comprises a matrix and a strengthening phase. The strengthening phase includes at least two types of strengthening phase particles with different sizes. The two types of strengthening phase particles with different sizes are type A particles and type B particles. The type A particles have a size of 50 nm or less, while the type B particles have a size that is greater than 50 nm and less than or equal to 200 nm. The volume of type A particles accounts for 85% to 95% of the total volume of all the strengthening phase particles; and the content of the strengthening phases is 0.5 to 3.0 wt. %.

The matrix is a Fe—Cr—W—Ti alloy.

The strengthening phase includes crystalline $Y_2O_3$ phase, Y—Ti—O phase, Y—Cr—O phase, and Y—W—O phase etc.

Preferably, the volume of the type A particles accounts for 88%-93% of the total volume of all the strengthening phase particles.

The present disclosure provides a multi-scale and multi-phase dispersion strengthened iron-based alloy, and preparation and characterization methods thereof. The preparation process comprises the following steps:

Step 1: weighing a pre-alloyed iron-based powder and a rare earth oxide powder containing $Y_2O_3$ according to a mass ratio of the pre-alloyed iron-based powder:rare earth oxide powder containing $Y_2O_3$=97-99.5:3-0.5; taking milling balls according to the ratio of the total mass of the powder materials to the mass of the milling ball=1:10-20; and filling the pre-alloyed iron-based powder, the rare earth oxide powder containing $Y_2O_3$, and the milling balls into a milling can, and then sealing the milling can;

Where the milling balls with diameters of 18-22 mm, 14-16 mm, 9-11 mm, 7-8.5 mm, 4.5-5.5 mm, and 2.5-3.5 mm are compatible according to the mass ratio of 1-2:1-2:1-2:1-2:1-2:1-2;

Step 2: vacuuming the milling can and then filling with an inert gas;

Step 3: installing the milling can in Step 2 to a planetary ball milling machine and then mechanical milling, where the mechanical milling parameters include a milling time of 40-120 h and preferably 55-65 h, and a milling rotation speed of 300-380 r/min;

Step 4: after the mechanical ball milling, sieving the powders under an inert gas atmosphere in a glove box to obtain an oxide dispersion strengthened powder; and Step 5: sequentially subjecting the obtained oxide dispersion strengthened iron-based alloy powder to hot extrusion, hot rolling, and heat treatment to prepare a multi-scale and multi-phase dispersion strengthened iron-based alloy, Where the hot extrusion parameters include an extrusion temperature of 850-1100° C. and preferably 900-980° C., and an extrusion ratio of 6-15:1 and preferably 10-12:1;

The hot rolling parameters include a temperature of 850-1100° C. and preferably 900-980° C., and a total deformation of 60-80%; and The heat treatment parameters include a temperature of 950-1200° C., preferably 1000-1100° C., and more preferably (hot extrusion temperature or hot rolling temperature)+A, where A is 80-120° C., holding 1-2 h, and air cooling to room temperature.

Preferably, according to the method for preparing a multi-scale and multi-phase dispersion strengthened iron-based alloy according in the present disclosure, in Step 1, the rare earth oxide containing $Y_2O_3$ is a $Y_2O_3$ powder.

Preferably, according to the method for preparing a multi-scale and multi-phase dispersion strengthened iron-based alloy in the present disclosure, in Step 1, the milling balls with diameters of 20 mm, 15 mm, 10 mm, 8 mm, 5 mm, and 3 mm are compatible according to the mass ratio of 1:1:1:1:1:1.

According to the multi-scale and multi-phase dispersion strengthened iron-based alloy and preparation method thereof in the present disclosure, the tensile strength of the fabricated multi-scale and multi-phase dispersion strengthened iron-based alloy is more than 1600 MPa and up to 1690 MPa at room temperature and more than 600 MPa at 700° C., and the elongation at room temperature is more than or equal to 10%.

After further optimization, the ODS iron-based alloy obtained in the present disclosure has a strengthening phase with a size of 2 nm to 500 nm, a tensile strength at room temperature of up to 1690 MPa, and an elongation at room temperature of 10.05%. The tensile strength of the alloy is 638 MPa at 700° C.

According to the method for preparing a multi-scale and multi-phase dispersion strengthened iron-based alloy in the present disclosure, two gas valves are disposed on the lid of the milling can for vacuuming and filling with an inert gas after sealing.

The protective gas is inert gas, such as argon.

The ball milling machine is a vertical planetary ball milling machine or an omni-directional planetary ball milling machine. The revolution and rotation directions are changed every 25-35 min during ball milling.

According to the method for preparing a multi-scale and multi-phase dispersion strengthened iron-based alloy of the present disclosure, the rare earth oxide powder containing $Y_2O_3$ has a particle size of 75 µm or less; and the pre-alloyed iron-based powder is a Fe—Cr—W—Ti alloy powder with a particle size of 150 µm or less.

The present disclosure, a method for characterizing a multi-scale and multi-phase dispersion strengthened iron-based alloy, comprises using the multi-scale and multi-phase dispersion strengthened iron-based alloy as a raw material, then separating strengthening phases in a multi-scale and multi-phase oxide dispersion strengthened iron-based alloy by electrolyzing, and characterizing at least one of the morphology, structure, and size features of the obtained strengthening phases by electron microscope.

The present disclosure, a method for characterizing a multi-scale and multi-phase dispersion strengthened iron-based alloy, comprises the following steps:

Step 1: putting the obtained multi-scale and multi-phase dispersion strengthened iron-based alloy into an electrolytic solution, and separating the strengthening phases from the iron-based alloy matrix by electrolyzing, to obtain an electrolytic solution containing the strengthening phase particles, where the electrolysis comprises electrolyzing at a constant voltage of 3-6 V using the bulk ferromagnetic dispersion-strengthened iron-based alloy as the anode, and an iron-containing conductive material as the cathode;

Step 2: extracting the electrolytic solution containing the strengthening phase particles prepared by electrolyzing, and diluting with an anhydrous organic solvent, to obtain a diluted suspension, where the anhydrous organic solvent includes or contains ethanol;

Step 3: dispersing the diluted suspension by ultrasonic to obtain a solution containing the strengthening phase particles with a size of nanometer to micron for use;

Step 4: taking the strengthening phase particles in the solution obtained in Step 3 as a test sample, dripping the solution containing the strengthening phase particles obtained in Step 3 onto an ultra-thin carbon support film for several times, and then drying to obtain the sample for electron microscope observation; and Step 5: characterizing the strengthening phase particles in the sample obtained in Step 4 by scanning electron microscope (SEM) and/or transmission electron microscope. The transmission electron microscope includes TEM and/or HRTEM.

In order to comprehensively characterize the distribution and the size, structure, morphology and other features of the strengthening phase particles, the microstructure of reaction surface of the multi-scale and multi-phase dispersion strengthened iron-based alloy before and after electrolysis is observed by OM (optical microscope) and/or SEM. The reaction surface is the surface of the multi-scale and multi-phase dispersion strengthened iron-based alloy immersed in the electrolytic solution.

Before Step 1, the reaction surface of the multi-scale and multi-phase dispersion strengthened iron-based alloy is polished using 500-2000 mesh waterproof abrasive paper, and then subjected to observe microstructure by OM and/or SEM. After Step 1, the reaction surface after electrolysis is then further subjected to observe microstructure by OM and/or SEM.

Of course, during the above operation, the depth of the multi-scale and multi-phase dispersion strengthened iron-based alloy immersed in the electrolytic solution and other parameters of electrolysis need to be controlled in Step 1. Combined with the micro-structures observed by OM and/or SEM before and after Step 1 and information of the strengthening phase particles obtained by characterization in Step 5, the distribution of the strengthening phases in the matrix and the size, structure, morphology, and other features of the strengthening phases can be investigated. Based on the characterization results of above features and combined with the testing results of mechanical properties, an alloy with better performance can be obtained through feedback of the above features information, control and adjustment of alloy composition and preparation process.

According to a multi-scale and multi-phase dispersion strengthened iron-based alloy, and preparation and characterization methods thereof of the present disclosure, the composition of the electrolytic solution used in Step 1 comprises 2-15 wt. % of a substance A, 15-25 wt. % of acetylacetone, and 3-15 wt. % of glycerol, with the balance being ethanol, and the electrolytic solution has a pH of 7-9, wherein the substance A is at least one selected from tetramethylammonium chloride, tetramethylammonium bromide, cetyltrimethylammonium chloride, and cetyltrimethylammonium bromide. The electrolytic solution used in the present disclosure has a significant application effect by being optimized. One or a mixture of two or more of tetramethylammonium chloride, tetramethylammonium bromide, cetyltrimethylammonium chloride, and cetyltrimethylammonium bromide serves as a surfactant, and can promote the reaction at the binding interface between the strengthening phase and the matrix during the reaction. Acetylacetone is to effectively complex the $Fe^{3+}$, to inhibit the formation of a colloid or fine precipitate through hydrolysis or alcoholics that will coat on the surface of the strengthening phase particles. Glycerol is to improve the fluidity and increase the viscosity of the electrolytic solution, so that the nano-strengthening phase particles can be suspended in the solution after detaching from the matrix, thus inhibiting the precipitation of the nano-phase particles.

According to a multi-scale and multi-phase dispersion strengthened iron-based alloy, and preparation and characterization methods thereof of the present disclosure, the electrolysis process in Step 1 comprises electrolysis at a constant voltage of 3-6 V using the multi-scale and multi-phase dispersion-strengthened iron-based alloy as the anode, and an iron-containing conductive material as the cathode. Preferably, the conditions of the constant-voltage electrolysis include room temperature, and an electrolysis time that is set according to the thickness required to be electrolyzed, and generally 10-20 min. The iron-containing conductive material is selected from one of stainless steel, low-carbon steel, or pure iron.

In Step 2, the electrolytic solution containing the strengthening phase particles is diluted with ethanol by a factor of 5-10.

According to a multi-scale and multi-phase dispersion strengthened iron-based alloy, and preparation and characterization methods thereof of the present disclosure, further preferably, the ultrasonic dispersing time in Step 3 is 15-20 min.

According to a multi-scale and multi-phase dispersion strengthened iron-based alloy, and preparation and characterization methods thereof of the present disclosure, further preferably, in Step 4, the strengthening phase particles in the solution obtained in Step 3 are used as a test object, the solution containing strengthening phase particles is dripped onto an ultra-thin carbon support film in several times, and drying to obtain a sample for electron microscope. The ultra-thin carbon support film has a three-layer film structure, and the thickness of the carbon support film is less than 5 nm.

According to a multi-scale and multi-phase dispersion strengthened iron-based alloy, and preparation and characterization methods thereof of the present disclosure, further preferably, the morphology, structure and size of the strengthening phase particles are observed by TEM and the structure of the nano-strengthening phase particles is observed by HRTEM in Step 4. Through observations by TEM and HRTEM, the influence of composition and preparation methods on the morphology, structure, and size of the strengthening phase can be analyzed. By mechanical property testing, the influence of the morphology, structure, and size of the strengthening phase on the properties of the alloy is obtained, which in turn provides important data for optimization.

According to the method for characterizing a multi-scale and multi-phase dispersion strengthened iron-based alloy of the present disclosure, the cathode structure shape may be cylindrical or hemispherical.

According to the method for characterizing a multi-scale and multi-phase dispersion strengthened iron-based alloy of the present disclosure, the magnification is higher than 400K under HRTEM mode.

According to the method for characterizing a multi-scale and multi-phase dispersion strengthened iron-based alloy of the present disclosure, the strengthening phase is preferably a non-magnetic or low-magnetic material to ensure the high accuracy of the detection result.

The present disclosure is applicable to the design and preparation of various multi-scale and multi-phase dispersion strengthened alloys or composite materials.

In the present disclosure, OM is optical microscope, SEM is scanning electron microscope, TEM is transmission electron microscope, HRTEM is a high-resolution transmission electron microscope, EDS is energy dispersive spectrometry, and EDS-Map is energy dispersive spectrometry for elemental mapping.

In view of the problems of existing ODS alloys, the present disclosure provides a multi-scale and multi-phase dispersion strengthened iron-based alloy, and preparation and characterization methods thereof. In the present disclosure, by coordinately controlling the mechanical milling parameters and the mass ratio of milling balls with various diameters, the $Y_2O_3$ powder is efficiently broken and high-density lattice defects are formed in $Y_2O_3$ powder by the high energy of ball milling, and $Y_2O_3$ also undergoes cubic-monoclinic transformation and amorphization, resulting in $Y_2O_3$ dominated by amorphous structure and containing a small amount of cubic and monoclinic nano-crystals, and nanoscale Y—Ti—O, Y—Cr—O, and Y—W—O are homogeneous distributed in the iron-based alloy powder matrix. This amorphous $Y_2O_3$ has a large number of lattice defects, which provide diffusion channels for Ti, W, and Cr atoms in the alloy powder. In the subsequent hot forming process, Ti, W, and Cr atoms diffuse and bind with amorphous $Y_2O_3$, to form a new nanoscale Y—Ti—O phase, Y—Cr—O phase, and Y—W—O phase, which are dispersed in the iron-based alloy matrix. The iron-based alloy with $Y_2O_3$, Y—Ti—O, Y—Cr—O, and Y—W—O dispersed distribution is prepared by powder forming. The nanoscale strengthening phase dispersed in the grains hinders the dislocation movement; and the strengthening phase distributed at the grain boundaries hinders the grain-boundary movement, thus improving the high-temperature mechanical properties of the ODS iron-based alloy.

(1) According to the multi-scale and multi-phase dispersion strengthened iron-based alloy, and preparation and characterization method thereof, the comprehensive utilization of nano-scale and submicron-scale strengthening phases is proposed for the first time. The strengthen particles are homogeneous distributed in the grains and grain boundaries, which result in the coherent strengthening effect on grains and grain boundaries of the alloy. It is firstly proposed to use the atomic diffusion channel provided by the high-density structural defects and amorphous structure of the oxide, to form multiple nano-scale oxide strengthening phases, which are homogeneously distributed in alloy matrix, so as to achieve the comprehensive strengthening effect.

(2) According to the present disclosure of the multi-scale and multi-phase dispersion strengthened iron-based alloy, and preparation and characterization method thereof, the atomized pre-alloyed powder with a single ferrite phase has the structural feature of rapid solidification and the alloy elements are homogeneous distributed, which provides structural conditions for the formation of multi-scale and multi-type strengthening phases.

(3) According to the present disclosure of the multi-scale and multi-phase dispersion strengthened iron-based alloy, and preparation and characterization method thereof, through the coordination of various ball milling parameters and $Y_2O_3$, a kind of oxide dispersion strengthened iron-based powder comprising multi-scale (several to several hundred nanometers) and multi-type strengthening phases (crystalline $Y_2O_3$, and amorphous $Y_2O_3$) homogeneous distributed in the matrix is prepared. It provides structural conditions for the formation of a multi-scale and multi-phase dispersion strengthening phase in the subsequent hot forming process. Moreover, combined with the information fed back by the characterization method of the present disclosure, the alloy composition and preparation process are optimized.

(4) According to the present disclosure of the multi-scale and multi-phase dispersion strengthened iron-based alloy, and preparation and characterization method thereof, based on the combination of the data information of the test results with the design of the process, a multi-scale (several to several hundred nanometers) and multi-phase (crystalline $Y_2O_3$, Y—Ti—O phase, Y—Cr—O phase, and Y—W—O phase) dispersion strengthened iron-based alloy is obtained by optimization. The alloy has excellent mechanical properties at room temperature to a high temperature because of the coordinated strengthen effect of the multi-scale and multi-type oxides.

(5) According to the present disclosure of the multi-scale and multi-phase dispersion strengthened iron-based alloy, and preparation and characterization method thereof, for the first time, the strengthening phase is completely separated from the alloy matrix without damage by electrolysis, and high-precision characterization of the morphology and structure of the nano-strengthening phase in the ferromagnetic alloy by TEM/HRTEM is achieved. The problem that the nano-strengthening phases in ferromagnetic alloy, particularly a strengthening phase of less than 50 nm, cannot be conveniently observed by TEM/HRTEM has been solved, while the original structure of the nano-strengthening phases has been retained. This characterizing method is convenient and efficient.

(6) According to the present disclosure of multi-scale and multi-phase dispersion strengthened iron-based alloy, and preparation and characterization method thereof, wherein the method for separating the strengthening phase from the iron-based alloy matrix by electrolysis, the electrolytic conditions are simple and feasible, and the operation is convenient and repeatable. Therefore, it is applicable to the preparation of a TEM/HRTEM observation sample of the strengthening phase in iron-based alloys.

(7) According to the present disclosure of the multi-scale and multi-phase dispersion strengthened iron-based alloy, and preparation and characterization method thereof, the electrolytic solution is used as a sample for preparing the TEM/HRTEM characterization sample of the nano-strengthening phase. This idea totally avoids the occurrence of contamination and the loss of the nano-strengthening phase during the transfer and collection process, and protects the original status of the sample.

(8) According to the present disclosure of the multi-scale and multi-phase dispersion strengthened iron-based alloy, and preparation and characterization method thereof, the non-magnetic strengthening phase separated from ferromagnetic materials without damage is individually analyzed, which is no signal interference and friendly to electron microscope during the characterization. The morphology, size, and structure of the separated strengthening phase were characterized by TEM/HRTEM, which effectively avoid the interference to the detection signal of the electron microscope and the damage to the electron microscope by ferromagnetic materials during the characterization by TEM/HRTEM. A high-resolution image of the nano-strengthening phase could be obtained, which is capable for accurately characterizing the structure of the nano-strengthening phase in the ferromagnetic alloy.

In summary, according to the present disclosure of the multi-scale and multi-phase dispersion strengthened iron-based alloy, and preparation and characterization method thereof, the design idea of ODS alloys by using nano-scale and submicron-scale phases to strengthen the grain and grain boundary is proposed for the first time. The present disclosure proposes for the first time the design idea of ODS alloys that use the atomic diffusion channel provided by the high-density structural defects and amorphous structure of the oxide to form a variety of nano and submicron scale complex oxides strengthening phases, which are homogeneous distributed in alloy matrix, to achieve the comprehensive strengthening effect of various nano and submicron complex oxides. Through the coordination of various preparation process parameters, a multi-scale and multi-phase dispersion strengthened iron-based alloy is prepared. The tensile strength of the alloy is more than 1600 MPa at room temperature, and more than 600 MPa at 700° C., and the elongation of alloy is greater than 10%, and the comprehensive mechanical properties are significantly better than those of alloys of the same grade and the same type.

BRIEF DESCRIPTION OF THE DRAWINGS

FIG. 1 shows that the ODS iron-based alloy prepared in Example 1 has a dense structure.

FIG. 2 shows that in the ODS iron-based alloy prepared in Example 1, the strengthening phases are homogeneous distributed in the grains and the grain boundaries, and grain size of the alloy is fine.

FIG. 3 shows that in the ODS iron-based alloy prepared in Example 1, the strengthening phase is in nano-scale which is less than 5 nm, but the image shows great interference. It is difficult to achieve high resolution image of this nano-scale oxide.

FIG. 6 shows that the size of the strengthening phase separated from the ODS iron-based alloy prepared in Example 1 is less than 0.2 μm.

FIG. 7 shows that a clear structure image of the strengthening phase separated from the ODS iron-based alloy prepared in Example 1 can be seen after the strengthening phase is magnified.

Figure 8:
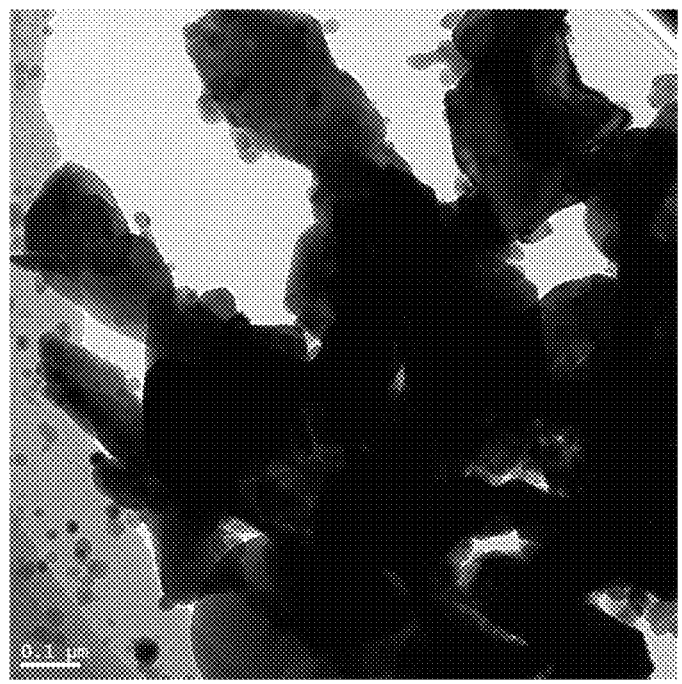
FIG. 8 presents a TEM image of a strengthening phase obtained in Comparative Example 2.

As can be seen from FIG. 8, most of the strengthening phase is larger than 200 nm in size, and the maximum size of the strengthening phase is about 5 μm.

DETAILED DESCRIPTION

Example 1: Fe-14Cr-3W-0.4Ti-1.5$Y_2O_3$ (wt. %) Alloy

Alloy Powder Preparation:

Step 1: A total of 150 g of an atomized Fe-14Cr-3W-0.4Ti (wt. %) pre-alloyed iron-based powder and a $Y_2O_3$ power was weighed according to a mass ratio of 98.5:1.5, and then filled into a milling can. The pre-alloyed iron-based powder had a particle size of 150 μm or less, and the $Y_2O_3$ powder had a particle size of 45 μm or less. According to a ball-to-powder ratio of 10:1, 1500 g of milling balls respectively with diameters of 20 mm, 15 mm, 10 mm, 8 mm, 5 mm and 3 mm according to a mass ratio 1:1:1:1:1:1 was weighed and then filled into the milling can.

Step 2: The milling can was sealed and vacuumed to a vacuum level of 0.1 Pa or less, and then filled with high-purity argon.

Step 3: Installing the milling can to a vertical planetary ball milling machine and then mechanical milling. The parameters of the mechanical milling were set as follows: the rotating speed was 300 r/min, and the mechanical milling time was 60 h. The revolution and rotation directions were changed every 30 minutes during ball milling.

Step 4: After the mechanical milling, the powders were sieved under an inert gas atmosphere in a glove box to obtain an oxide dispersion strengthened powder.

Alloy Bulk Preparation:

Step 1: The above prepared iron-based alloy powder was filled into a pure-iron can, and vacuumed to 0.1 Pa or less. The gas pipe was seal welded. Hot extrusion was performed at a temperature of 850° C., an extrusion speed of 15 mm/s, and an extrusion ratio of 10:1. Then the can was separated by wire cutting to obtain a hot formed ODS iron-based alloy.

Step 2: The ODS iron-based alloy formed by hot extrusion was hot rolled at a temperature of 850° C., a rolling speed of 0.36 m/s, and a total deformation of 80%.

Step 3: The hot-rolled ODS iron-based alloy was heat treated at a temperature of 950° C. for 1 h and air cooling, to obtain a multi-scale and multi-phase dispersion strengthened iron-based alloy.

Alloy Microstructure Characterization:

Before the strengthening phases were electrolytically separated from the Fe-14Cr-3W-0.4Ti-1.5$Y_2O_3$ alloy, microstructure of the alloy was characterized by OM, then characterized by electron microscope according to the following steps:

Step 1: The Fe-14Cr-3W-0.4Ti-1.5$Y_2O_3$ alloy sample was used as the anode and a stainless steel cylinder was used as the cathode. The strengthening phases in the Fe-14Cr-3W-0.4Ti-1.5$Y_2O_3$ alloy were electrolytically separated from the matrix in an electrolytic solution, to obtain an electrolytic solution containing the strengthening phases. Where the electrolytic solution was composed of 2 wt. % of tetramethylammonium chloride, 15 wt. % of acetylacetone, and 3 wt. % of glycerol, with the balance being ethanol. The electrolysis parameters included a voltage of 6V, and an electrolysis time of 10 min.

Step 2: The electrolytic solution containing the strengthening phases prepared by electrolysis was extracted, and then diluted with ethanol by a factor of 5, to obtain a suspension containing the strengthening phases with nanometer to micron size.

Step 3: The suspension containing the strengthening phases prepared in Step 2 was dispersed by ultrasonic for 10 min, to obtain a solution containing the strengthening phases with nanometer to micron size for use;

Step 4: The solution obtained by ultrasonic dispersion in Step 3 was dripped onto an ultra-thin carbon support film for 3 times, and dried to obtain a sample for electron microscope.

Step 5: The microstructure of reaction surface after electrolysis was observed by SEM; and the strengthening phases in the sample prepared in Step 4 were characterized by transmission electron microscope.

The ODS iron-based alloy obtained in this example has a strengthening phase with a size of 2 nm to 200 nm, a tensile strength of up to 1680 MPa and an elongation of 10.85% at room temperature. The tensile strength of the alloy is 620 MPa at 700° C.

Figure 1:
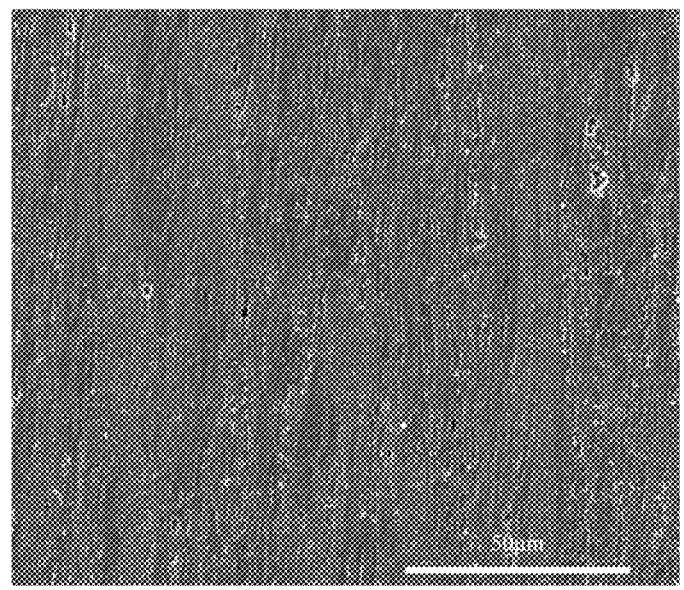
FIG. 1 presents a SEM image showing the microstructure of the ODS iron-based alloy in Example 1.
Figure 2:
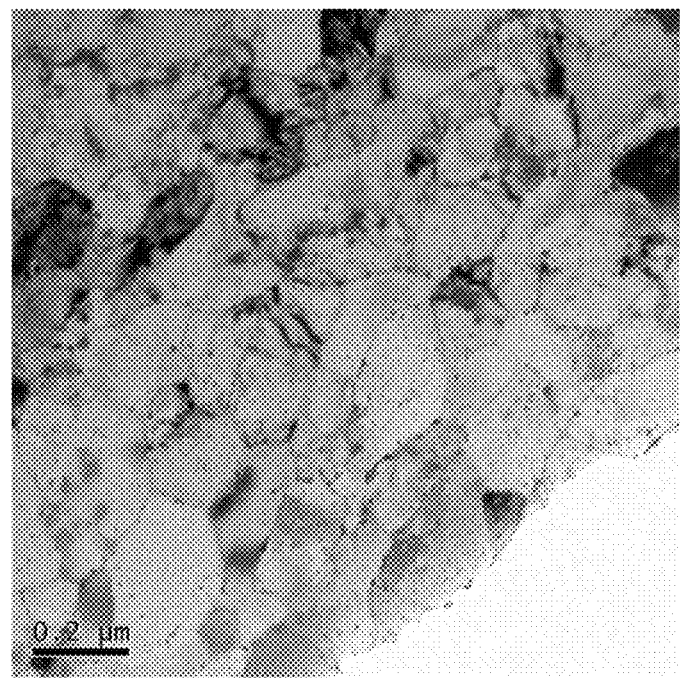
FIG. 2 presents a TEM image showing the microstructure of the ODS iron-based alloy in Example 1.
Figure 3:
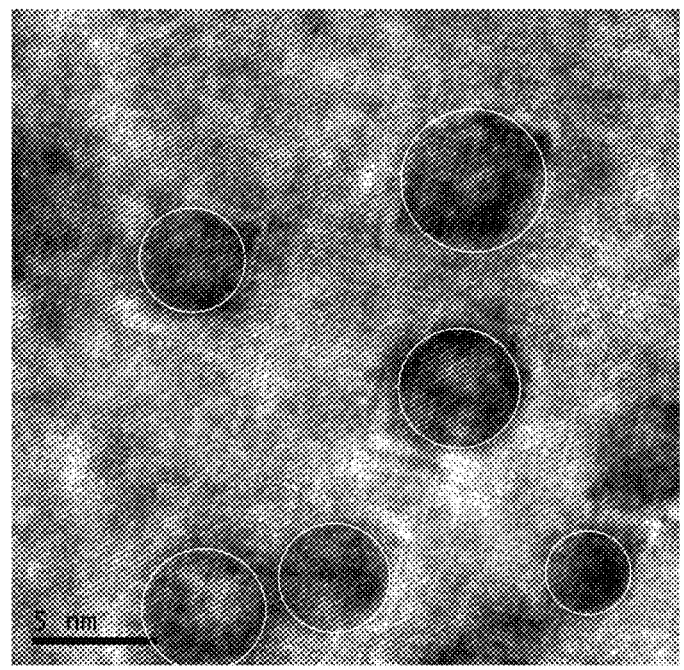
FIG. 3 presents a HRTEM image of a nano-strengthening phase in the ODS iron-based alloy in Example 1.

FIG. 1 is a SEM image showing the microstructure of an ODS iron-based alloy in Example 1. FIG. 2 is a TEM image showing the microstructure of the ODS iron-based alloy in Example 1. The alloy has a fine grain structure and the strengthening phases are homogeneous distributed in the matrix (the grain and grain boundary). FIG. 3 is a HRTEM image of a nano-strengthening phase in the ODS iron-based alloy in Example 1. The size of the strengthening phase is less than 5 nm, and the interference is very large as seen from FIG. 3. After finished the observation shown in FIGS. 2 and 3, the TEM device needs to be undergone astigmatism of the objective lens at different magnifications. The electron beam status and beam condition need to be readjusted.

Figure 4:
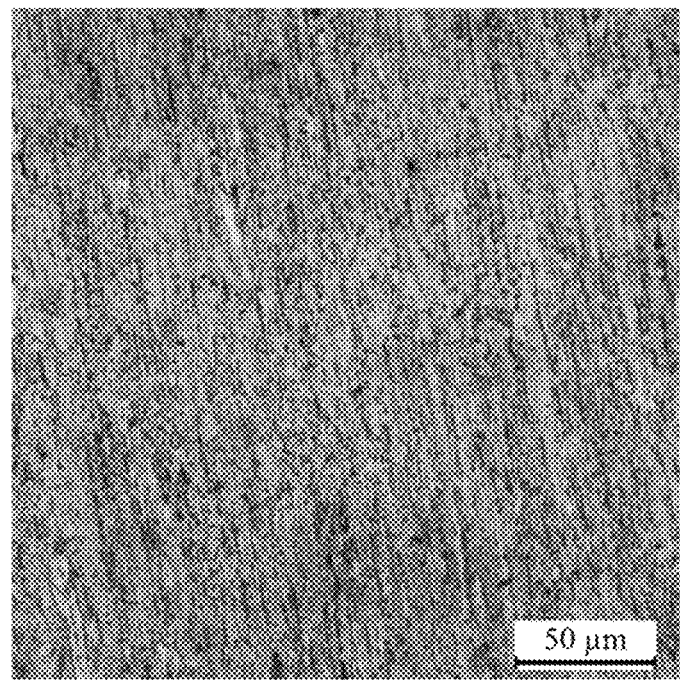
FIG. 4 presents an OM image of the ODS iron-based alloy microstructure in Example 1 before electrolysis.
Figure 5:
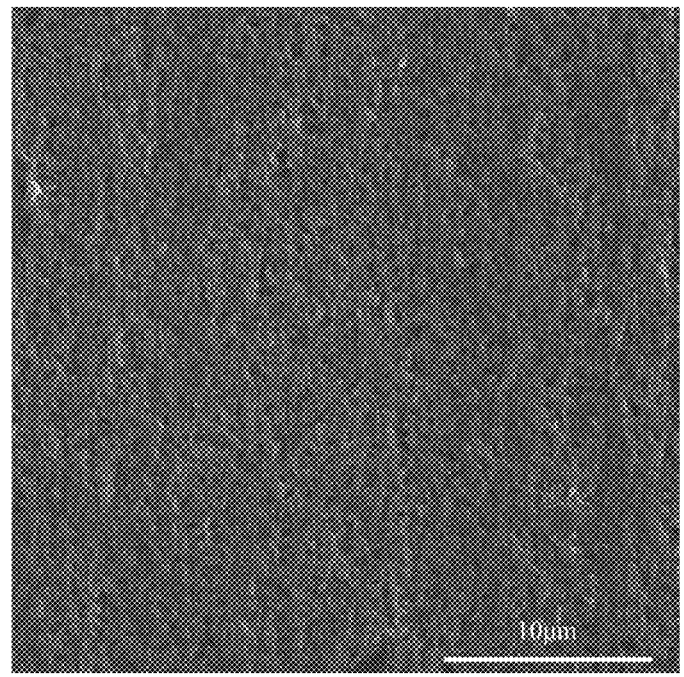
FIG. 5 presents a SEM image showing the microstructure of the alloy electrolysis surface in Example 1 after electrolysis.
Figure 6:
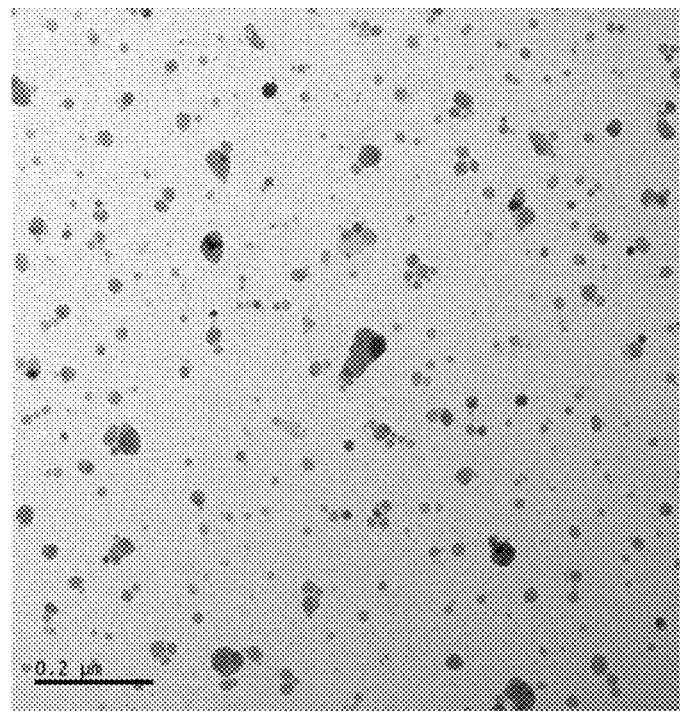
FIG. 6 presents a TEM image showing the morphology of the nano-strengthening phase separated from the ODS iron-based alloy in Example 1.

FIG. 4 is an OM image showing the microstructure of the ODS iron-based alloy in Example 1 before electrolysis. FIG. 5 is a SEM image showing the electrolysis surface microstructure of the alloy after electrolysis. The pits left on the reaction surface of the alloy after the strengthening phase separated from the alloy matrix by the electrolytic reaction can be observed through comparison of FIGS. 4 and 5. FIG. 6 is a TEM image showing the nano-strengthening phase microstructure in Example 1. As can be seen from FIG. 6, the size of the nano-strengthening particles is totally distributed in the range of 2-20 nm, and some strengthening phase has a size larger than 50 nm; but the size of all strengthening phase is less than 200 nm. Comprehensive statistics of 5 TEM images of this sample show that the volume of particles with a size of 50 nm or less accounts for about 86% of the total volume of all particles in the strengthening phase.

Figure 7:
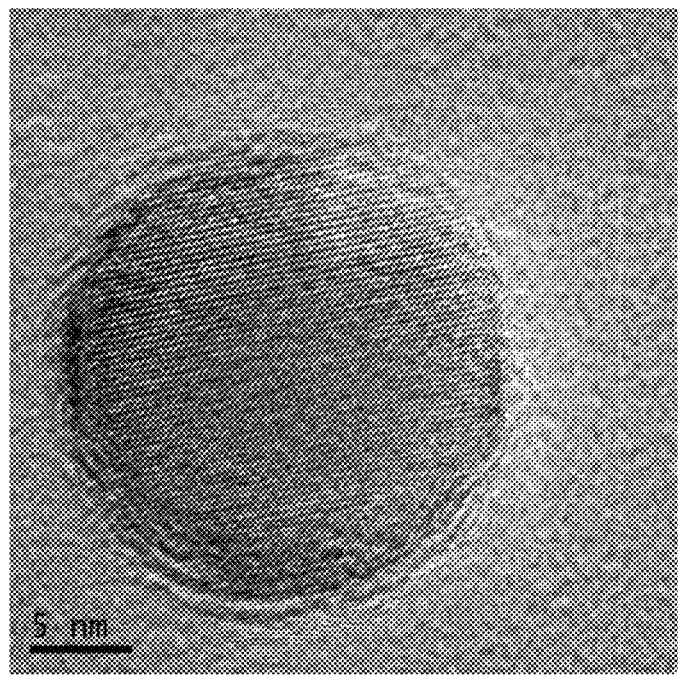
FIG. 7 presents a HRTEM image of the nano-strengthening phase separated from the ODS iron-based alloy in Example 1.

FIG. 7 is a HRTEM image of the nano-strengthening phase of Example 1. In FIG. 7, the nano-strengthening phase has a size of about 15 nm, and a clear structure of the nano-strengthening phase can be observed.

Example 2: Fe-14Cr-3W-0.4Ti-1.0$Y_2O_3$ (wt. %) Alloy

Alloy Powder Preparation:

Step 1: A total of 150 g of an atomized Fe-14Cr-3W-0.4Ti (wt. %) pre-alloyed iron-based powder and a $Y_2O_3$ power was weighed according to a mass ratio of 99:1, and then filled into a milling can. The pre-alloyed iron-based powder had a particle size of 150 μm or less, and the $Y_2O_3$ powder had a particle size of 75 μm or less. According to a ball-to-material ratio of 10:1, 1500 g of milling balls respectively with diameters of 20 mm, 15 mm, 10 mm, 8 mm, 5 mm and 3 mm according to a mass ratio 1:1:1:1:1:1 was weighed and filled into the milling can.

Step 2: The milling can was sealed and vacuumed to a vacuum level of 0.1 Pa or less, and then filled with high-purity argon.

Step 3: Installing the milling can to a vertical planetary ball milling machine and then mechanical milling. The parameters of the mechanical milling were set as follows: the rotating speed of 320 r/min, and the mechanical milling time of 120 h. The revolution and rotation directions were changed every 30 minutes during mechanical milling.

Step 4: After the mechanical milling, the powders were sieved under an inert gas atmosphere in a glove box to obtain an oxide dispersion strengthened powder.

Alloy Bulk Preparation:

Step 1: The above prepared iron-based alloy powder was filled into a pure-iron can, and vacuumed to 0.1 Pa or less. The gas pipe was seal welded. Hot extrusion was performed at a temperature of 950° C., an extrusion speed of 25 mm/s, and an extrusion ratio of 11:1. Then the can was separated by wire cutting to obtain a hot formed ODS iron-based alloy.

Step 2: The ODS iron-based alloy formed by hot extrusion was hot rolled at a temperature of 950° C., a rolling speed of 0.36 m/s, and a total deformation of 90%.

Step 3: The hot-rolled ODS iron-based alloy was heat treated at a temperature of 1050° C. for 1 hr, and air cooling, to obtain a multi-scale and multi-phase dispersion strengthened iron-based alloy.

Alloy microstructure characterization: The characterization method in this example was the same as that in Example 1.

The ODS iron-based alloy obtained in this example has a strengthening phase with a size of 5 nm to 500 nm, a tensile strength of up to 1620 MPa, and an elongation of 10.13% at room temperature. The tensile strength of the alloy is 605 MPa at 700° C.

Example 3: Fe-14Cr-3W-0.4Ti-2.0$Y_2O_3$ (wt. %) Alloy

Alloy Powder Preparation:

Step 1: A total of 150 g of an atomized Fe-14Cr-3W-0.4Ti (wt. %) pre-alloyed iron-based powder and a $Y_2O_3$ power was weighed according to a mass ratio of 98:2, and filled into a milling can. The pre-alloyed iron-based powder had a particle size of 150 μm or less, and the $Y_2O_3$ powder had a particle size of 45 μm or less. According to a ball-to-material ratio of 10:1, 1500 g of milling balls respectively with diameters of 20 mm, 15 mm, 10 mm, 8 mm, 5 mm and 3 mm according to mass ratio 1:1:1:1:1:1 was weighed and filled into the milling can.

Step 2: The milling can was sealed and vacuumed to a vacuum level of 0.1 Pa or less, and then filled with high-purity argon.

Step 3: The milling can was installed to a vertical planetary ball milling machine and mechanical milling. The parameters of the mechanical milling were set as follows: the rotating speed of 300 r/min, and the mechanical milling time of 60 h. The revolution and rotation directions were changed every 30 minutes during mechanical ball milling.

Step 4: After the mechanical milling, the powders were sieved under an inert gas atmosphere in a glove box to obtain an oxide dispersion strengthened powder.

Alloy Bulk Preparation:

Step 1: The above prepared iron-based alloy powder was filled into a pure-iron can, and vacuumed to 0.1 Pa or less. The gas pipe was seal welded. Hot extrusion was performed at a temperature of 950° C., an extrusion speed of 15 mm/s, and an extrusion ratio of 12:1. Then the can was separated by wire cutting to obtain a hot formed ODS iron-based alloy.

Step 2: The ODS iron-based alloy formed by hot extrusion was hot rolled at a temperature of 950° C., a rolling speed of 0.36 m/s, and a total deformation of 80%.

Step 3: The hot-rolled ODS iron-based alloy was heat treated at a temperature of 1050° C. for 1 hr, and air cooling, to obtain a multi-scale and multi-phase dispersion strengthened iron-based alloy.

Alloy microstructure characterization: The characterization method in this example was the same as that in Example 1.

The ODS iron-based alloy obtained in this example has a strengthening phase with a size of 2 nm to 500 nm, a tensile strength of up to 1690 MPa, and an elongation of 10.05% at room temperature. The tensile strength of the alloy is 638 MPa at 700° C.

Example 4: Fe-14Cr-3W-0.4Ti-0.5$Y_2O_3$ (wt. %)

Alloy Powder Preparation:

Step 1: A total of 150 g of an atomized Fe-14Cr-3W-0.4Ti (wt. %) pre-alloyed iron-based powder and a $Y_2O_3$ power was weighed according to a mass ratio of 99.5:0.5, and then filled into a milling can. The pre-alloyed iron-based powder had a particle size of 150 μm or less, and the $Y_2O_3$ powder had a particle size of 75 μm or less. According to a ball-to-material ratio of 10:1, 1500 g of milling balls respectively with diameters of 20 mm, 15 mm, 10 mm, 8 mm, 5 mm and 3 mm according to a mass ratio 1:1:1:1:1:1 was weighed and filled into the milling can.

Step 2: The milling can was sealed and vacuumed to a vacuum level of 0.1 Pa or less, and then filled with high-purity argon.

Step 3: Installing the milling can to a vertical planetary ball milling machine and then mechanical milling. The parameters of the mechanical milling were set as follows: the rotating speed was 300 r/min, and the milling time was 120 h. The revolution and rotation directions were changed every 30 minutes during mechanical milling.

Step 4: After the mechanical milling, the powders were sieved under an inert gas atmosphere in a glove box to obtain an oxide dispersion strengthened powder.

Alloy Bulk Preparation:

Step 1: The above prepared iron-based alloy powder was filled into a pure-iron can, and vacuumed to 0.1 Pa or less. The gas pipe was seal welded. Hot extrusion was performed at a temperature of 950° C., an extrusion speed of 15 mm/s, and an extrusion ratio of 8:1. Then the can was separated by wire cutting to obtain a hot formed ODS iron-based alloy.

Step 2: The ODS iron-based alloy formed by hot extrusion was hot rolled at a temperature of 950° C., a rolling speed of 0.36 m/s, and a total deformation of 90%.

Step 3: The hot-rolled ODS iron-based alloy was heat treated at a temperature of 1050° C. for 1 h, and air cooling, to obtain a multi-scale and multi-phase dispersion strengthened iron-based alloy.

Alloy microstructure characterization: The characterization method in this example was the same as that in Example 1.

The ODS iron-based alloy obtained in this example has a strengthening phase with a size of 2 nm to 500 nm, a tensile strength at room temperature of up to 1608 MPa, and an elongation at room temperature of 11.35%. The tensile strength of the alloy is 605 MPa at 700° C.

Comparative Example 1:
Fe-14Cr-3W-0.4Ti-1.0$Y_2O_3$ (wt. %) Alloy

Alloy Powder Preparation:

Step 1: A total of 150 g of an atomized Fe-14Cr-3W-0.4Ti (wt. %) pre-alloyed iron-based powder and a $Y_2O_3$ power was weighed according to a mass ratio of 99:1, and then filled into a milling can. The pre-alloyed iron-based powder had a particle size of 150 μm or less, and the $Y_2O_3$ powder had a particle size of less than 150 μm. According to a ball-to-material ratio of 10:1, 1500 g of milling balls respectively with diameters of 20 mm, 15 mm, 10 mm, 8 mm, 5 mm and 3 mm according to a mass ratio 1:1:1:1:1:1 was weighed and filled into the milling can.

Step 2: The milling can was sealed and vacuumed to a vacuum level of 0.1 Pa or less, and then filled with high-purity argon.

Step 3: Installing the milling can to a vertical planetary ball milling machine and then mechanical milling. The parameters of the mechanical ball milling were set as follows: the rotating speed was 300 r/min, and the mechanical ball milling time was 40 h. The revolution and rotation directions were changed every 30 minutes during mechanical ball milling.

Step 4: After the mechanical milling, the powders were sieved under an inert gas atmosphere in a glove box to obtain an oxide dispersion strengthened powder.

Alloy Bulk Preparation:

Step 1: The above prepared iron-based alloy powder was filled into a pure-iron can, and vacuumed to 0.1 Pa or less. The gas pipe was seal welded. Hot extrusion was performed at a temperature of 1200° C., an extrusion speed of 15 mm/s, and an extrusion ratio of 8:1. Then the can was separated by wire cutting to obtain a hot formed ODS iron-based alloy.

Step 2: The ODS iron-based alloy formed by hot extrusion was hot rolled at a temperature of 950° C., a rolling speed of 0.36 m/s, and a total deformation of 80%.

Step 3: The hot-rolled ODS iron-based alloy was heat treated at a temperature of 1050° C. for 1 h, and air cooling, to obtain a multi-scale and multi-phase dispersion strengthened iron-based alloy.

Alloy microstructure characterization: The characterization method in this comparative example was the same as that in Example 1.

The ODS iron-based alloy obtained in this comparative example has a strengthening phase with a size of greater than 0.5 μm, a tensile strength of 1293 MPa, and an elongation of 6.23% at room temperature. The tensile strength of the alloy is 425 MPa at 700° C.

Comparative Example 2:
Fe-14Cr-3W-0.4Ti-1.0$Y_2O_3$ (wt. %) Alloy

Preparation of Alloy Powder:

Step 1: A total of 150 g of an atomized Fe-14Cr-3W-0.4Ti (wt. %) pre-alloyed iron-based powder and a $Y_2O_3$ power was weighed according to a mass ratio of 99:1, and then filled into a milling can. The pre-alloyed iron-based powder had a particle size of 150 μm or less, and the $Y_2O_3$ powder had a particle size of 75 μm or less. According to a ball-to-material ratio of 10:1, 1500 g of milling balls respectively with diameters of 20 mm, 10 mm, and 5 mm according to a mass ratio 1:1:1 was weighed and filled into the milling can.

Step 2: The milling can was sealed and vacuumed to a vacuum level of 0.1 Pa or less, and then filled with high-purity argon.

Step 3: Installing the milling can to a vertical planetary ball milling machine and then mechanical milling. The parameters of the mechanical milling were set as follows: the rotating speed was 300 r/min, and the milling time was 60 h. The revolution and rotation directions were changed every 30 minutes during mechanical milling.

Step 4: After the mechanical milling, the powders were sieved under an inert gas atmosphere in a glove box to obtain an oxide dispersion strengthened powder.

Alloy bulk preparation: The alloy preparation method in this comparative example was the same as that in Comparative Example 1.

Alloy microstructure characterization: The alloy characterization method in this comparative example was the same as that in Example 1.

The ODS iron-based alloy obtained in this comparative example has a strengthening phase with a size of greater than 0.8 μm, a tensile strength of 1025 MPa, and an elongation of 5.10% at room temperature. The tensile strength of the alloy is 367 MPa at 700° C.

FIG. 8 is a TEM image of a strengthening phase in the ODS iron-based alloy obtained in Comparative Example 2. It can be seen that the size of the strengthening phase is larger than 200 nm, and the maximum size of the strengthening phase is about 5 μm.

What is claimed is:

1. A method for preparing a multi-scale and multi-phase dispersion strengthened iron-based alloy, comprising the following steps:
    Step 1: weighing a pre-alloyed iron-based powder and a rare earth oxide powder containing $Y_2O_3$, according to a mass ratio of the pre-alloyed iron-based powder:the rare earth oxide powder containing $Y_2O_3$=97-99.5:3-0.5;
    taking milling balls, according to a ratio of a total mass of the pre-alloyed iron-based powder and the rare earth oxide powder containing $Y_2O_3$ to a mass of the milling balls=1:10-20; and
    filling the pre-alloyed iron-based powder, the rare earth oxide powder containing $Y_2O_3$, and the milling balls into a milling can, and then closing the milling can, wherein the milling balls have diameters of 18-22 mm, 14-16 mm, 9-11 mm, 7-8.5 mm, 4.5-5.5 mm, and 2.5-3.5 mm according to a mass ratio of 1-2:1-2:1-2:1-2:1-2:1-2;
    Step 2: vacuuming the milling can, and then filling with an inert gas;
    Step 3: installing the milling can in Step 2 to a planetary ball milling machine, and then mechanical milling, wherein parameters of the mechanical milling include a milling time of 40-120 hrs, and a milling rotation speed of 300-380 r/min;
    Step 4: after the mechanical milling, sieving the powders under an inert gas atmosphere in a glove box to obtain an oxide dispersion strengthened iron-based alloy powder; and
    Step 5: sequentially subjecting the obtained oxide dispersion strengthened iron-based alloy powder to hot extrusion, hot rolling, and heat treatment to prepare the multi-scale and multi-phase dispersion strengthened iron-based alloy,
    wherein parameters of the hot extrusion include an extrusion temperature of 850-1100° C. and an extrusion ratio of 6-15:1,
    parameters of the hot rolling include a temperature of 850-1100° C., and a total deformation of 60-80%,
    parameters of the heat treatment include a temperature of 950-1200° C., holding 1-2 hrs, and air cooling to room temperature,
    wherein the multi-scale and multi-phase dispersion strengthened iron-based alloy comprises a matrix and a strengthening phase,
    wherein the strengthening phase comprises at least two types of strengthening phase particles with different sizes, the two types of the strengthening phase particles with different sizes are type A particle and type B particle, a size of the type A particle is less than or equal to 50 nm, and a size of the type B particle is larger than 50 nm and less than or equal to 200 nm, a volume of the type A particle accounts for 85% to 95% of a total volume of all the strengthening phase particles, and a content of the strengthening phase is 0.5 to 3.0 wt. %,
    the matrix is a Fe—Cr—W—Ti alloy,
    the strengthening phase comprises crystalline $Y_2O_3$ phase, Y—Ti—O phase, Y—Cr—O phase, and Y—W—O phase.

2. The method for preparing the multi-scale and multi-phase dispersion strengthened iron-based alloy according to claim 1, wherein
    a tensile strength of the fabricated multi-scale and multi-phase dispersion strengthened iron-based alloy is more than 1600 MPa at room temperature and more than 600 MPa at 700° C.

3. The method for preparing the multi-scale and multi-phase dispersion strengthened iron-based alloy according to claim 1, wherein
    two gas valves are disposed on a lid of the milling can for vacuuming and filling with the inert gas as a protective gas after sealing,
    the protective gas is argon,
    the ball milling machine is a vertical planetary ball milling machine or an omni-directional planetary ball milling machine, and revolution and rotation directions are changed every 25-35 min during ball milling.

4. The method for preparing the multi-scale and multi-phase dispersion strengthened iron-based alloy according to claim 1, wherein
    a particle size of the rare earth oxide powder containing $Y_2O_3$ is 75 μm or less, and the pre-alloyed iron-based powder is Fe—Cr—W—Ti alloy powder with a particle size of 150 μm or less.

* * * * *